2 Sheets—Sheet 1.

G. H. BURPEE.

Assignor to THE AMERICAN FUEL ECONOMIZER COMPANY.

APPARATUS FOR HEATING FEED WATER.

No. 11,162. Reissued May 5, 1891.

Witnesses:
C. E. Hunt,
Alfred T. Gage.

Inventor:
George H. Burpee,
by David A. Burt,
Attorney.

THE NORRIS PETERS CO., PHOTO-LITHO., WASHINGTON, D. C.

G. H. BURPEE.

Assignor to THE AMERICAN FUEL ECONOMIZER COMPANY.

APPARATUS FOR HEATING FEED WATER.

No. 11,162. Reissued May 5, 1891.

Witnesses:
C. E. Hunt.
Alfred T. Gage.

Inventor:
George H. Burpee
by David A. Burr
Attorney.

THE NORRIS PETERS CO., PHOTO-LITHO., WASHINGTON, D. C.

UNITED STATES PATENT OFFICE.

GEORGE H. BURPEE, OF NEW YORK, N. Y., ASSIGNOR TO THE AMERICAN FUEL ECONOMIZER COMPANY.

APPARATUS FOR HEATING FEED-WATER.

SPECIFICATION forming part of Reissued Letters Patent No. 11,162, dated May 5, 1891.

Original No. 441,392, dated November 25, 1890. Application for reissue filed April 2, 1891. Serial No. 387,557.

*To all whom it may concern:*

Be it known that I, GEORGE H. BURPEE, of the city, county, and State of New York, have invented certain new and useful Improvements in Fuel-Economizers or Apparatus for Heating Feed-Water; and I do hereby declare that the following is a full and exact description thereof, reference being had to the accompanying drawings, and to the letters of reference marked thereon, making a part of this specification.

My invention relates to improvements in the construction of apparatus for economizing fuel by heating the water-supply for a steam-generator or other purposes by means of the hot gases and products of combustion escaping into a smoke flue or chimney.

It has for its object to reduce the cost of construction and erection and to increase the efficiency of this class of fuel-economizers; and it consists in the novel construction, combination, and arrangement of parts, substantially as hereinafter described and claimed.

Figure 1:
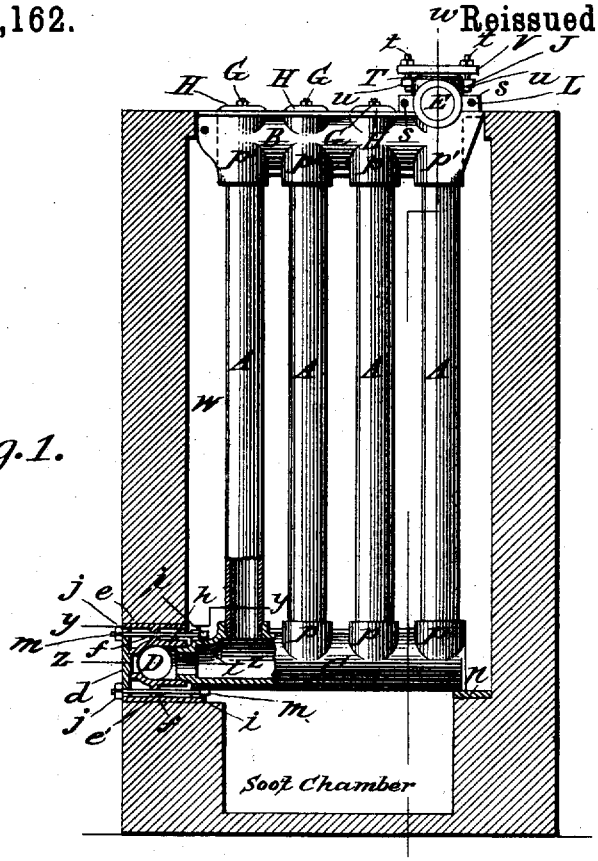
Figure 2:
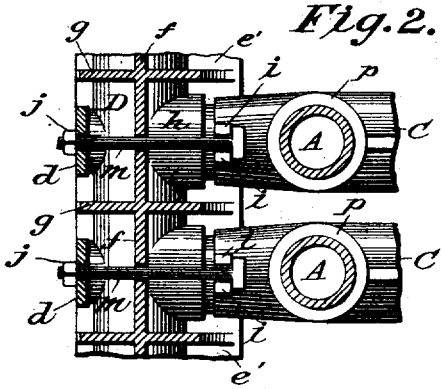
Figure 3:
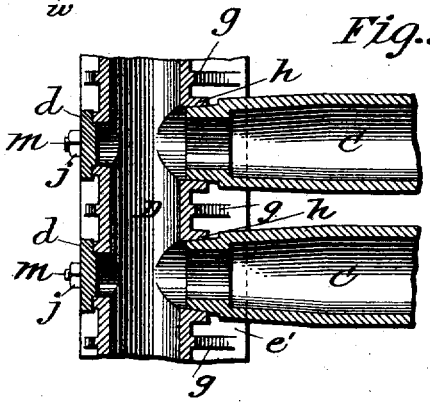
Figure 4:
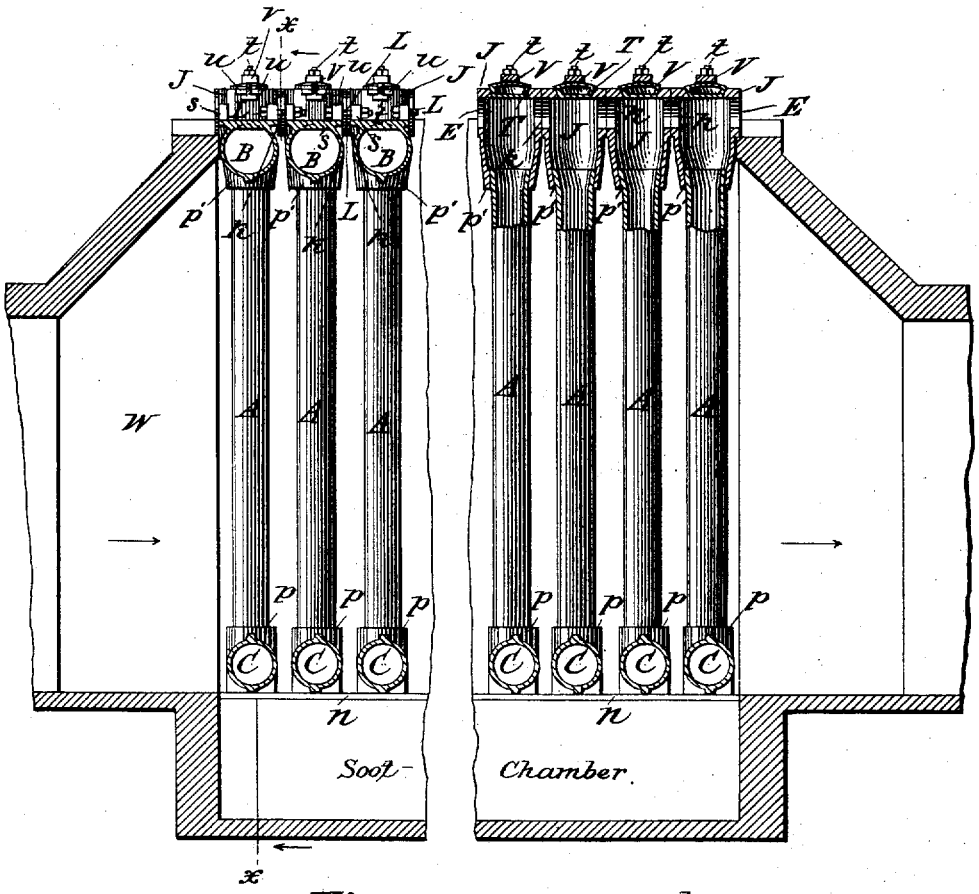

In the accompanying drawings, Figure 1 is a vertical transverse section of my improved apparatus in line *x x* of Fig. 4. Fig. 2 is an enlarged sectional detail of the lower manifold or longitudinal connecting-pipe and its wall-plates, taken horizontally through the top web in line *y y* of Fig. 1. Fig. 3 is a similar enlarged sectional detail taken horizontally and centrally in line *z z* of Fig. 1. Fig. 4 is a partial and irregular longitudinal vertical section in line *w w* of Fig. 1; and Fig. 5 a detailed vertical longitudinal section, on an enlarged scale, of the coupling end of one of the top boxes.

Similar letters of reference indicate corresponding parts in all of the figures.

A A in the drawings represent the vertical circulating-tubes, B B the top and C C the bottom boxes, D the lower longitudinal manifold or connecting pipe, and E the upper connecting-passage and delivery-pipe, in my improved fuel-economizer. The top and bottom boxes are made cylindrical instead of rectangular in form, thereby increasing their strength.

The lower manifold or longitudinal connecting-pipe D is interposed between two flanges or parallel wall-plates *e* and *e'*, which by preference are each connected to the pipe by a central longitudinal web *f* and at intervals by transverse ribs *g g*. It is, furthermore, formed with a series of nozzles or nipples *h h* upon its inner side to receive the bottom boxes C C, and with opposite openings or hand-holes of smaller diameter. These openings or hand-holes are each covered and closed by a covering-plate *d*, made fast by two T-headed bolts *m m*, (see Fig. 2,) whose heads are made to engage slotted ears *i i*, projecting at diametrically-opposite points from the coupling end of each bottom box C, and which, extending through perforations in the web *f* on top and bottom of the manifold D and in ears on the hand-hole plates *d d*, are secured by nuts *j j*, screwing upon their outer ends, as shown in Fig. 2.

The coupling ends of the bottom boxes C C are made tapering to enter tapering seats or sockets in the lateral nozzles *h h* of the manifold, as shown in Fig. 3, and are drawn up into said sockets to make a close joint therewith by means of the bolts *m m*, as shown in Fig. 2. This form of joint obviates the need of packing-rings and the multiplicity of bolts found in the flanged joints found in the fuel-economizers now in use.

The wall-plates or horizontal flanges *e e'* of the manifold adapt it to be built horizontally into the side wall of the flue W, in which the economizer is to be used, to form an integral part thereof, as shown in Fig. 1.

The inner independent ends of the several bottom boxes rest for support in their horizontal position upon a ledge *n*, built in the opposite side wall of the flue, as shown in Fig. 1.

Figure 5:
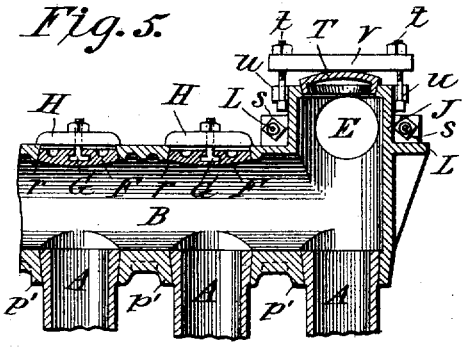

The nozzles or nipples *p p*, formed in the upper side of each bottom box C, for the reception of the vertical tubes A A, are made tapering, as shown in Fig. 1, to receive the tapering ends of the tubes, which are forced therein by hydraulic pressure or other equivalent means. The openings through the nozzles or nipples *p' p'*, formed on the under side of each of the top boxes B B to receive the upper ends of the vertical tubes A A, are inwardly enlarged, and the upper end of the tubes are formed with a counterpart outward bevel, as shown in Figs. 4 and 5, so that by dropping the tube through the nozzle with its lower end foremost the outwardly-tapering upper end may be driven from within into the conical seat in the nozzle. To permit of thus inserting the tube lengthwise through the nozzle, a hand-hole *r* is formed, as shown in Fig. 5, in the top box B, opposite each nozzle *p'*, of a diameter sufficiently large to allow the tube to pass through it. These hand-holes *r r* are severally closed by stoppers F F, each having a beveled rim to fit into a beveled or conical seat encircling the hand-hole, said seat being inwardly enlarged so that the stopper must needs be inserted into its seat from the inside of the box.

The stopper F, when inserted, is secured by means of a T-headed bolt G, Fig. 5, whose head engages an inwardly-enlarged recess in the center of the stopper and whose threaded stem extends upward therefrom through an outer transverse bar H spanning the hand-hole, and is fitted with a nut by which to draw the stopper up tightly into place, as shown in Fig. 5.

The top boxes B B are all connected at one end to form an upper circulating and delivery passage E by means of a chamber J, formed on the end of each top box over the last vertical tube therein, said chamber being formed with lateral nozzles K K, faced off to abut end to end with a close joint, (see Fig. 4,) and which are united and drawn fast together by means of lateral bolts L L, engaging lateral ears *s s* on each chamber, as shown in Figs. 4 and 5. The hand-hole in the top of each of the coupling-chambers J is large enough to admit of the introduction through it into the top box B of the internal stoppers G G for its hand-holes, and is closed by an outer cap T, fitting down into it with a beveled joint, as shown in Fig. 5, and which is secured by means of an outer diametric cross-bar V placed thereon and confined at each end by bolts *t t* engaging lateral ears or lugs *u u* on the chamber.

The novel construction of the lower manifold D, whereby it admits of incorporation in the side wall of the flue, greatly economizes space and avoids the disadvantages attendant upon carrying the bottom boxes C C through the wall, and thereby positively fixing them so as to render their removal and replacement impracticable without disturbance of the wall.

Each pair of top and bottom boxes B C, together with the vertical tubes A A connecting them, constitutes a transverse section of the apparatus, and by means of my invention, as described, each section admits of ready removal, if occasion requires, without disturbance of the rest. So, also, by reason of the opposite taper of the opposite ends of the vertical tubes in each section a broken or cracked tube may be readily removed by drawing it up and out through the corresponding hand-hole in the top box and a new one inserted and driven in place to make a tight joint at both ends without disturbing any other tube in the section. The cross-connection effected at one end of the top boxes B B by the coupling chambers and nozzles formed thereon to be drawn together by means of bolts avoids the necessity of a separate manifold above the boxes and of the numerous connections incident thereto, and by securing the stoppers F F for the hand-holes in the top boxes by means of external cross-bars and central bolts the stoppers are readily drawn up into their seats and firmly held in position, so as to resist any outward blow thereon, while throughout the apparatus no wrought-iron is exposed to the action of the water therein.

In the use of the apparatus the water to be heated is supplied, as usual, to the lower manifold D at one end, and after circulating slowly through the bottom and top boxes C B and vertical tubes A A A is delivered from the nozzle of the coupling-chamber on the top box at the opposite end of the apparatus.

I claim as my invention—

1. The combination, with the lower manifold in a fuel-economizer, substantially as described, of the inner side nozzles having tapering sockets, the bottom boxes severally formed with tapering ends to enter said sockets, the outer ears upon the ends of the bottom boxes, the corresponding ears on the outer side of the manifold, and the transverse outer bolts passing through both ears, whereby a tight joint is formed between the bottom box and manifold and firmly secured by means of external bolts alone, substantially in the manner and for the purpose herein set forth.

2. The combination, in a fuel-economizer, substantially as described, with the side walls of a furnace-discharge flue, of a lower supply-manifold having an upper and lower horizontal flange, each connected therewith by a longitudinal web, thereby adapting it for incorporation with the one side wall of the furnace-flue and having also inner side nozzles with tapering openings and outer hand-holes opposite said nozzle-openings, bottom boxes supported at one end by the opposite side wall of the flue, each having nozzles on its upper side to receive the vertical circulating-tubes, and bolts passing transversely through the ears on the hand-hole plate, and the webs supporting the upper and lower wall-plates to engage ears on the bottom boxes, substantially in the manner and for the purpose herein set forth.

3. The combination, in a fuel-economizer, with a bottom box having outwardly-enlarged tapering sockets on its upper side and with a top box having on its under side inwardly-enlarged tapering sockets of greater diameter than the sockets in the bottom box and on its upper side hand-holes of corresponding diameter, of a series of vertical circulating-tubes whose upper and lower ends are both tapered in the same direction, whereby both of said ends will, after the tubes have been dropped through the hand-holes in the upper box, seat themselves and form close joints in the oppositely-tapered sockets of the top and bottom boxes without extraneous packing, substantially in the manner and for the purpose herein set forth.

4. The combination, with the walls of a furnace-flue, of a supply-manifold incorporated in the one side wall of the flue and having lateral nozzles projecting therefrom within the flue and opposite hand-holes on its outer side, bottom boxes entering at one end the lateral nozzles of the supply-manifold and supported at the other by the opposite wall of the flue, vertical circulating-tubes fitted in the bottom boxes with tapering joints, top boxes to which the upper ends of the vertical tubes are coupled with inwardly-enlarged joints and having hand-holes opposite each vertical tube, stoppers closing said hand-holes from within the box with beveled joints, cross-bars spanning each hand-hole, a bolt passing through each cross-bar and engaging the stopper to draw it to its seat, coupling-chambers formed on the upper side of the corresponding ends of the several top boxes to unite them and having lateral openings to form when united a through-passage between the several top boxes, lateral bolts engaging the several chambers to draw them together, and an outer cap covering a hand-hole in the top of each coupling-chamber, all substantially in the manner and for the purpose herein set forth.

GEORGE H. BURPEE.

Witnesses:
A. N. JESBERA,
E. M. WATSON.